(12) United States Patent
Guevorkian et al.

(10) Patent No.: US 7,720,140 B2
(45) Date of Patent: May 18, 2010

(54) SIGNAL PROCESSING METHOD, RECEIVER AND EQUALIZING METHOD IN RECEIVER

(75) Inventors: David Guevorkian, Tampere (FI); Kim Rounioja, Oulu (FI)

(73) Assignee: Nokia Corporation, Espoo (FI)

( * ) Notice: Subject to any disclaimer, the term of this patent is extended or adjusted under 35 U.S.C. 154(b) by 796 days.

(21) Appl. No.: 11/482,083

(22) Filed: Jul. 7, 2006

(65) Prior Publication Data

US 2007/0253514 A1 Nov. 1, 2007

(30) Foreign Application Priority Data

Apr. 28, 2006 (FI) .................................. 20065276

(51) Int. Cl.
*H03H 7/30* (2006.01)

(52) U.S. Cl. ........................ 375/232; 375/350; 708/300; 708/323

(58) Field of Classification Search ................. 375/324, 375/340–346, 350, 299–232; 708/300, 322, 708/323
See application file for complete search history.

(56) References Cited

U.S. PATENT DOCUMENTS

| | | | | |
|---|---|---|---|---|
| 6,625,203 | B2* | 9/2003 | De et al. ..................... | 375/147 |
| 6,873,596 | B2* | 3/2005 | Zhang et al. ................. | 370/210 |
| 6,904,036 | B2* | 6/2005 | Pan et al. ..................... | 370/342 |
| 6,937,644 | B2* | 8/2005 | Pan et al. ..................... | 375/147 |
| 7,054,300 | B2* | 5/2006 | Pan et al. ..................... | 370/342 |
| 7,103,092 | B2* | 9/2006 | Zeira .......................... | 375/147 |
| 7,218,693 | B2* | 5/2007 | Troulis ........................ | 375/346 |
| 7,269,207 | B2* | 9/2007 | Lilleberg et al. ............. | 375/152 |
| 7,280,604 | B2* | 10/2007 | Giannakis et al. ........... | 375/260 |
| 7,289,552 | B2* | 10/2007 | Kwak et al. .................. | 375/147 |
| 7,420,916 | B2* | 9/2008 | Zhang et al. ................. | 370/210 |
| 7,447,255 | B2* | 11/2008 | De et al. ...................... | 375/147 |
| 7,483,480 | B2* | 1/2009 | Guo et al. .................... | 375/232 |
| 7,502,312 | B2* | 3/2009 | Zhang et al. ................. | 370/210 |
| 2001/0033614 | A1* | 10/2001 | Hudson ....................... | 375/229 |

(Continued)

FOREIGN PATENT DOCUMENTS

WO   WO 2004/102847 A2   11/2004

(Continued)

OTHER PUBLICATIONS

International Search Report PCT/FI2007/050228 filed Apr. 26, 2007.

*Primary Examiner*—Temesghen Ghebretinsae
(74) *Attorney, Agent, or Firm*—Squire, Sanders & Dempsey L.L.P.

(57) ABSTRACT

A signal processing method, receiver and equalizing method are provided. The receiver comprises an estimator estimating a channel coefficient matrix from a received signal, a first calculation unit determining a channel correlation matrix based on the channel coefficient matrix a converter converting the channel correlation matrix into a circulant matrix. A second calculation unit determines equalization filter coefficients by applying a first transform to the real parts of a first subset of the terms in the first column of the circulant matrix and by applying a second transform to the imaginary parts of a second subset of the terms in the first column of the circulant matrix. An equalizer equalizes the received signal by using the determined equalization filter coefficients.

23 Claims, 2 Drawing Sheets

U.S. PATENT DOCUMENTS

| | | | |
|---|---|---|---|
| 2003/0043767 A1* | 3/2003 | Pan et al. | 370/335 |
| 2003/0185295 A1* | 10/2003 | Yousef | 375/233 |
| 2004/0151236 A1* | 8/2004 | Lilleberg et al. | 375/150 |
| 2006/0109891 A1 | 5/2006 | Guo et al. | |
| 2007/0253514 A1* | 11/2007 | Guevorkian et al. | 375/350 |

FOREIGN PATENT DOCUMENTS

| | | |
|---|---|---|
| WO | WO 2004/110003 A1 | 12/2004 |
| WO | WO 2005/120000 A1 | 12/2005 |
| WO | WO 2006/016722 A1 | 2/2006 |
| WO | WO 2006/106171 A1 | 10/2006 |

\* cited by examiner

SIGNAL PROCESSING METHOD, RECEIVER AND EQUALIZING METHOD IN RECEIVER

FIELD

The invention relates to an equalizing method in a receiver of a telecommunication system. The invention relates also to a signal processing method. In particular, the invention relates to an equalizing method where matrix inversion is required.

BACKGROUND

In a typical cellular radio environment the signals between a base station and subscriber terminal equipment propagate on several routes between a transmitter and a receiver. This multi-path propagation is mainly caused by signal reflections from surrounding surfaces. Signals traveling on different routes arrive at the receiver at different times because of a different propagation delay. This holds true for both directions of transmission.

In the receiver the multipath propagated signal may be equalized, i.e. the received signal is processed in such a manner that the effect of multipath propagation can be reduced.

In modern communication systems the processing of a received signal is a challenging task due to high data rates and complex modulation methods used in the transmission. For example, equalization in systems employing High Speed Downlink Packet Access (HSDPA) requires processing and calculating of large matrices. Inversion of a large matrix in particular is a complex task.

In many systems where matrix inversions are calculated in connection with equalization, Discrete Fourier Transform (DFT) is applied. The calculation of a complex DFT algorithm requires a large amount of processing. This requires large computational power from receivers. The computational needs grow larger as the need for faster data rates and larger bandwidths increase in the future evolutions of present telecommunication systems.

BRIEF DESCRIPTION OF THE INVENTION

An object of the invention is to provide an improved solution for realizing equalization in a receiver of a telecommunication system. Another object is to provide an improved signal processing method. According to an aspect of the invention, there is provided an equalizing method in a receiver of a telecommunication system, the method comprising: receiving a signal, estimating a channel coefficient matrix from the received signal, determining a channel correlation matrix based on the channel coefficient matrix, converting the channel correlation matrix into a circulant matrix, determining equalization filter coefficients by applying a first transform to the real parts of a first subset of the terms in the first column of the circulant matrix and by applying a second transform to the imaginary parts of a second subset of the terms in the first column of the circulant matrix, and equalizing the received signal by using the determined equalization filter coefficients.

According to another aspect of the invention, there is provided an equalizing method in a receiver of a telecommunication system, the method comprising: receiving a signal, estimating a channel coefficient matrix from the received signal, determining a channel correlation matrix based on the channel coefficient matrix, determining equalization filter coefficients by applying a first transform to the real parts of a first subset of the terms in the first column of the channel correlation matrix and by applying a second transform to the imaginary parts of a second subset of the terms in the first column of the channel, and equalizing the received signal by using the determined equalization filter coefficients.

According to another aspect of the invention, there is provided a receiver in a telecommunication system, comprising: means for estimating a channel coefficient matrix from a received signal, means for determining a channel correlation matrix based on the channel coefficient matrix, means for converting the channel correlation matrix into a circulant matrix, means for determining equalization filter coefficients by applying a first transform to the real parts of a first subset of the terms in the first column of the circulant matrix and by applying a second transform to the imaginary parts of a second subset of the terms in the first column of the circulant matrix, and means for equalizing the received signal by using the determined equalization filter coefficients.

According to another aspect of the invention, there is provided a receiver in a telecommunication system, comprising: an estimator estimating a channel coefficient matrix from a received signal, a first calculation unit determining a channel correlation matrix based on the channel coefficient matrix, a converter converting the channel correlation matrix into a circulant matrix, a second calculation unit determining equalization filter coefficients by applying a first transform to the real parts of a first subset of the terms in the first column of the circulant matrix and by applying a second transform to the imaginary parts of a second subset of the terms in the first column of the circulant matrix, and an equalizer equalizing the received signal by using the determined equalization filter coefficients.

According to another aspect of the invention, there is provided a receiver in a telecommunication system, comprising: an estimator estimating a channel coefficient matrix from a received signal, a first calculation unit determining a channel correlation matrix based on the channel coefficient matrix, a second calculation unit determining equalization filter coefficients by applying a first transform to the real parts of a first subset of the terms in the first column of the channel coefficient matrix and by applying a second transform to the imaginary parts of a second subset of the terms in the first column of the channel coefficient matrix, and an equalizer equalizing the received signal by using the determined equalization filter coefficients.

According to another aspect of the invention, there is provided a computer program distribution medium readable by a computer and encoding a computer program of instructions for executing a computer process for equalizing a received signal in a receiver of a telecommunication system, the process comprising: estimating a channel coefficient matrix from the received signal; determining a channel correlation matrix based on the channel coefficient matrix; determining equalization filter coefficients by applying a first transform to the real parts of a first subset of the terms in the first column of the channel correlation matrix and by applying a second transform to the imaginary parts of a second subset of the terms in the first column of the channel correlation matrix, and equalizing the received signal by using the determined equalization filter coefficients.

According to yet another aspect of the invention, there is provided an signal processing method, comprising: receiving as input a signal in the form of a Hermitian matrix, converting the Hermitian matrix into a circulant matrix, determining the inverse of the circulant matrix by applying a first transform to the real parts of a first subset of the terms in the first column of the circulant matrix and by applying a second transform to the imaginary parts of a second subset of the terms in the first column of the circulant matrix, calculating the other columns on the basis of the first column by circular shifts and outputting a signal in the form of the inverse of the circulant matrix.

According to yet another aspect of the invention, there is provided a signal processor comprising as an input a signal in the form of a Hermitian matrix, the processor being configured to convert the Hermitian matrix into a circulant matrix, determine the inverse of the circulant matrix by applying a first transform to the real parts of a first subset of the terms in the first column of the circulant matrix and by applying a second transform to the imaginary parts of a second subset of the terms in the first column of the circulant matrix, calculate the other columns on the basis of the first column by circular shifts and output a signal in the form of the inverse of the circulant matrix.

Embodiments of the invention provide several advantages. The proposed solution takes into account that a channel correlation matrix calculated from the received signal is not only circulant but also Hermitian with a real-valued main diagonal. Thus the number of operations required for determining the inverse of the matrix may be reduced by approximately a factor of four. Instead of implementing an L-point complex-valued FFT, an (L/2)-point real-valued fast Type-1 Discrete Cosine Transform (FDCT-1) and fast Type-1 Discrete Sine Transform (FDST-1) are utilized in the proposed solution. Therefore, the implementation time may be reduced due to the smaller number of required operations. Furthermore, the memory required in the calculations and data movements may be reduced (due to shorter arrays). In addition, the solution may reduce the energy consumption of the receiver.

In an embodiment of the invention, the solution is applied to a receiver of a system employing HSDPA. The solution is applicable also to other systems, such as WCDMA without HSDPA and CDMA2k systems and evolutions of these systems.

Embodiments of the invention are not limited to equalization applications or to telecommunication systems. Embodiments of the invention may be applied to general signal processing applications or any other applications, where circulant Hermitian matrix inversions are needed.

LIST OF DRAWINGS

In the following, the invention will be described in greater detail with reference to the embodiments and the accompanying drawings, in which FIG. 1 illustrates an example of a structure of a cellular telecommunication system;

DESCRIPTION OF EMBODIMENTS

The present invention is applicable to various telecommunication systems. A typical non-limiting example of a system to which the invention can be applied is UMTS (Universal Mobile Telecommunication System) and the evolutions of UMTS.

Figure 1:
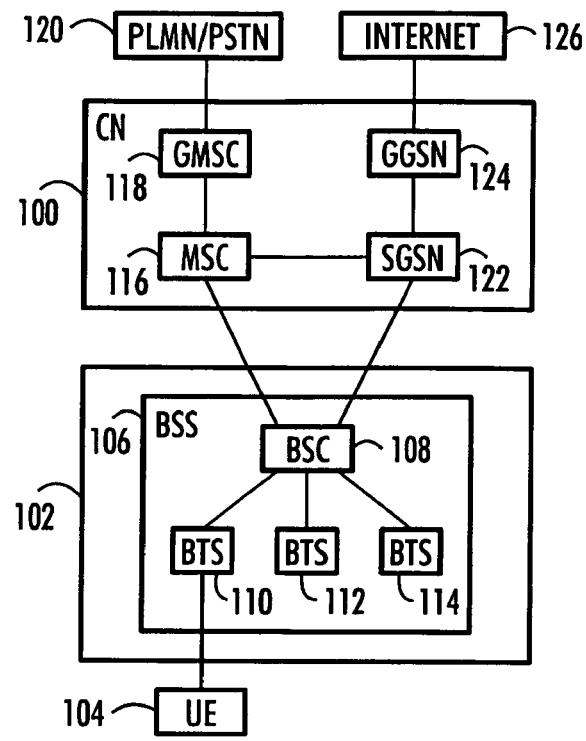

Let us take a closer look at FIG. 1, which illustrates an example of a structure of a cellular telecommunication system. FIG. 1 is a simplified block diagram describing the most important cellular telecommunication system parts at network element level and interfaces between them. The structure and operation of the network elements are not described in detail, since they are commonly known.

The cellular telecommunication system may be divided into a core network (CN) 100, a radio access network (RAN) 102, and a mobile station (MS) 104.

The RAN 102 includes a base station system (BSS) 106, which includes a base station controller (BSC) 108 and base stations (BTS) 110, 112 and 114. A base station system, a base station controller and a base station may also be called a radio network subsystem (RNS), a radio network controller (RNC) and node B, correspondingly.

The structure of the core network 100 supports both circuit-switched connections and packet-switched connections.

A Mobile Services Switching Center MSC 116 is the center of the circuit-switched side of the core network 100. The functions of the mobile services switching center 116 include: switching, paging, location registration of user equipment, handover management, collecting subscriber billing information, encryption parameter management, frequency allocation management and echo cancellation. The number of mobile services switching centres 116 may vary: a small network operator may be provided with a single mobile services switching center 116, but larger core networks 100 may be provided with several.

Larger core networks 100 may comprise a separate Gateway Mobile Services Switching Center GMSC 118 handling the circuit-switched connections between the core network 100 and external networks 120. The gateway mobile services switching center 118 is located between the mobile services switching centers 116 and the external networks 120. The external network 120 may for instance be a Public Land Mobile Network PLMN or a Public Switched Telephone Network PSTN.

The network elements described in FIG. 1 are operational entities, and the physical implementation thereof may vary.

A Serving GPRS Support Node SGSN 122 is the center of the packet-switched side of the core network 100. The main task of the serving GPRS support node 122 is to transmit and receive packets with the user equipment 104 supporting packet-switched transmission using the base station system 106. The serving GPRS support node 122 includes subscriber data and location information concerning the user equipment 104.

A Gateway GPRS Support Node GGSN 124 is the corresponding part on the packet-switched side to the gateway GMSC 118 on the circuit-switched side. The gateway GPRS support node 124 must be able to route the outgoing traffic from the core network 100 to external networks 126. In this example, the Internet represents the external networks 126.

The base station system 106 is composed of a Base Station Controller BSC 108 and Base Transceiver Stations or Base Stations BTS 110, 112 and 114. The base station controller 108 controls the base stations 110, 112 and 114. In principle, the aim is to place the equipment implementing the radio path and the functions associated therewith in the base station 110, 112 and 114 and to place the control equipment in the base station controller 108.

The base station 110, 112 and 114 is responsible for creating physical carriers. Typically, one base station serves one cell, but a solution is also possible in which one base station 110, 112 or 114 serves several sectorized cells. The base station 110, 112 and 114 has following functions: calculations of timing advance, measurements in the uplink direction, channel coding, encryption, decryption, and frequency hopping, for example.

The subscriber terminal 104 includes at least one transceiver that implements the radio connection to the radio access network 102 or to the base station system 106. In addition, the subscriber terminal 104 typically comprises an antenna, a processor controlling the operation of the device, and a battery. Many kinds of subscriber terminals 104 with various properties exist, for instance vehicle-mounted and portable terminals.

A terminal requires a radio channel when it communicates with a base station during a call, for example. A radio channel is allocated to the terminal in a network element of the telecommunication system responsible for channel allocation.

Figure 2:
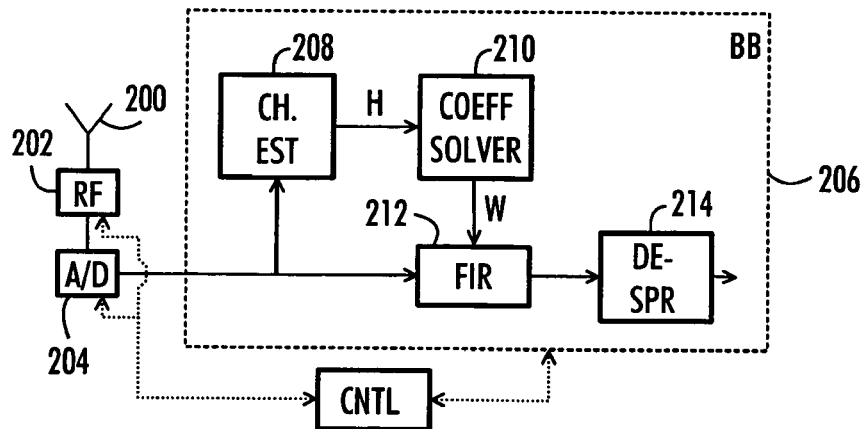
FIG. 2 illustrates an example of a receiver where embodiments of the invention may be utilized.

Equalization may be applied both in uplink and downlink directions. FIG. 2 illustrates an example of a receiver to which embodiments of the invention may be applied. The receiver may be a base station receiver or a mobile station receiver.

The receiver comprises an antenna 200 which receives a signal transmitted by a transmitter. The received signal may comprise multipath propagated components. These signal components propagated via different paths arrive at the receiver at different times. A WCDMA receiver may utilize multipath diversity, i.e. combine the signal components. However, to enhance signal quality, equalization may be applied to the received signal.

The signal is taken to a radio frequency unit 202 which filters and amplifies the signal. The amplified signal is taken to a converter 204 which converts the signal into a digital form. From the converter the signal is taken to base band parts 206 of the receiver. The receiver may comprise a controller 220 which controls the operations of the different parts of the receiver. The controller may be realized using a processor and appropriate software.

The base band parts 206 comprise a channel estimator 208 calculating estimates for the channel as experienced by the received signal. The estimates may be formulated as a channel coefficient matrix H.

The channel coefficient matrix H is taken to a coefficient solver 210 which determines equalization filter coefficients w. The coefficients w are taken to a finite impulse response filter 212 which performs equalization to the received signal by filtering the signal. The tap values of the filter are determined by the calculated coefficients. The equalized signal is taken to despreader 214 which despreads the received signal. From the despreader the signal is taken to another part of the receiver (not shown).

Figure 3:
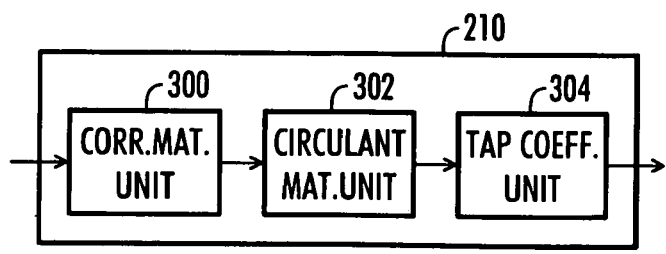
FIG. 3 illustrates an example of a coefficient solver.

FIG. 3 illustrates an example of the coefficient solver 210. As an input, the coefficient solver receives the channel coefficient matrix H. The purpose of the coefficient solver is to determine the equalization filter coefficients, which may be expressed in matrix form as $$w = H^*(HH^* + sI)^{-1}\delta, \quad (1)$$

where superscript * denotes a complex conjugate, s is channel noise variance, and δ is Kronecker delta vector. The noise variance is obtained in the channel estimation unit 208.

The coefficient solver 210 comprises a correlation matrix calculation unit 300, which is configured to calculate a correlation matrix $$A = HH^* + sI \quad (2)$$

which is an L×L Hermitian Toeplitz matrix with real valued entries on the diagonal. The dimension L is a constant integer depending on the parameters of the telecommunication system. The terms on the diagonal include a signal to noise estimate. When determining the equalization filter coefficients the correlation matrix A should be inverted. The calculation of the inverse of a large matrix is a complex problem requiring computational power.

The coefficient solver 210 comprises a circulant matrix calculation unit 302 which is configured to convert the channel correlation matrix A into a circulant form. A circulant matrix is a special kind of Toeplitz matrix where each column vector is circularly shifted one element downwards relative to the preceding column vector. In the conversion, elements of the matrix are copied over other elements and thus some information is lost. However, it is well known in the art that the quality of the equalization coefficients is only negligibly worsened due to the conversion. The converted matrix may be denoted as C and it takes the following form:

$$C = \begin{bmatrix} r_1 & \cdots & r_m & 0 & \cdots & r_m^* & \cdots & r_3^* & r_2^* \\ r_2^* & r_1 & \cdots & r_m & 0 & \cdots & r_m^* & \cdots & r_3^* \\ \vdots & & & & & & & \ddots & \\ r_m^* & \cdots & r_1 & \cdots & r_m & 0 & \cdots & 0 & r_m^* \\ 0 & r_m^* & \cdots & r_1 & \cdots & r_m & 0 & \cdots & 0 \\ \vdots & & & & & & & & \\ r_m & 0 & \cdots & 0 & r_m^* & \cdots & r_1 & \cdots & r_{m-1} \\ \vdots & \ddots & 0 & & & \ddots & & \ddots & \\ r_2 & \cdots & r_m & & & & r_m^* & \cdots & r_1 \end{bmatrix}, \quad (3)$$

where the terms $r_1, \ldots, r_m$ are estimates of channel covariance. The diagonal term $r_1$ is a real number.

In some systems, such as in an WCDMA system employing HSDPA, there is no need for constructing the circulant matrix C. The equalization coefficients may be calculated using the channel correlation matrix A. This is due to the system properties.

In an embodiment of the invention, equalization filter coefficients are determined by applying a first transform on the real parts of a first subset of the terms of the first column of the circulant matrix and applying a second transform on the imaginary parts of a second subset of the terms of the first column of the circulant matrix.

In an embodiment, the first subset and the second subset exclude at least one term of the first column. In following, the first subset comprises L/2+1 terms, and the second subset comprises L/2−1 terms, where L is the total number of terms in the first column. However, the invention is not limited to these values. For example, embodiments where subsets comprise less than L/2−1 terms of the first column may easily be designed.

The coefficient solver 210 comprises a tap coefficient calculation unit 304. The tap coefficient calculation unit is configured to determine the equalization filter coefficients w. In general, the purpose is to determine a vector $$w_D = [w_D^0, w_D^1, \ldots, w_D^{L-1}]^T, \quad D = 0, 1, \ldots, L-1, \quad (4)$$

which is the $D^{th}$ column of the matrix $C^{-1}$, the inverse of the matrix C. The calculation of w comprises determining the inverse of matrix C. However, because in this case the matrix C is circulant and Hermitian, it is sufficient to determine only the subvector $$w_0 = [w_0^0, w_0^1, \ldots, w_0^{L/2}]^T \quad (5)$$

of the first $L/2+1$ components of only the first column $w_0$ of $C^{-1}$. The other $L/2-1$ components of the first column may be then obtained as conjugates of these components on the basis of relation $$w_o^l(w_o^{L-l})^*, \qquad l=L/2+1,\ldots,L-1, \qquad (6)$$

because the matrix C and also $C^{-1}$ is circulant and Hermitian. From this follows that the $D^{th}$ column $w_D$ for an arbitrary $D=0, 1, \ldots, L-1$, may be obtained by a circular shift for D positions down from $w_1$.

Next, let us define a few notations and definitions. In following, notations Re( ) and Im( ) are used for the real and imaginary part of a scalar or vector variable. In addition, for a vector denoted x a notation x(n:m) is used to denote the subvector of x consisting of components indexed n through m.

Let us denote $C_1^{L/2+1}$ as the $(L/2+1)\times(L/2+1)$ matrix with entries $b_n \cos(\pi nm/(L/2))$, $n,m=0,\ldots,L/2$, $b_n=1, n=1,\ldots,L/2-1$ and $b_0=b_{L/2}=1/2$. This matrix is a lightly modified matrix of the well-known Type 1 Discrete Cosine Transform (DCT) matrix of order $L/2+1$, which consists of entries $b_m b_n \cos(\pi nm/(L/2))$, $n,m=0,\ldots,L/2$, $b_n=1, n=1,\ldots,L/2-1$, and $b_0=b_{L/2}=1/\sqrt{2}$. It is well known in the art that the Type 1 DCT of order $N+1$ may be computed with a fast algorithm which requires $(N/2)\log_2 N-3N/4$ multiplications and $(3N/2)\log_2 N-N/2$ additions. Since a transform using the matrix $C_1^{L/2+1}$ differs from a $(L/2+1)$-point Type 1 DCT only in the scaling of two inputs and two outputs, there exists also a fast algorithm for implementing a transform using the matrix $C_1^{L/2+1}$ requiring four extra multiplications at most compared to a fast $(L/2+1)$-point Type 1 DCT. Therefore, the complexity of the transform with the matrix $C_1^{L/2+1}$ is not greater than $(L/4)\log_2 L-5L/8+4$ multiplications and $(3L/4)\log_2 L-L$ additions.

Furthermore, let us denote $S_1^{L/2-1}$ as the $(L/2-1)\times(L/2-1)$ matrix of the Type 1 Discrete Sine Transform (DST) with entries $\sin(\pi nm/(L/2))$, $n,m=1,\ldots,L/2-1$. It is to be noted that also for this transform there exists a fast algorithm with the complexity of $(L/4)\log_2 L-3L/4$ multiplications and $(3L/4)\log_2 L-7L/4-\log_2 L+3$ additions.

Using the above notation, it can be stated that for an arbitrary $L\times L$ circulant Hermitian matrix C with real entries on the main diagonal, the real and the imaginary parts of a subvector $\overline{w}_0=w_0(0:L/2)$ of the first column $w_0$ of $C^{-1}$ can be expressed as follows:

$$Re(\overline{w}_0)=C_1^{L/2+1}Qp, \quad Im(\overline{w}_0)=[0, S_1^{L/2-1}Qs, 0] \qquad (7)$$

where $$p=[p_0,p_1,\ldots,p_{L/2}]=C_1^{L/2+1}(Re(c_0(0:L/2))), \qquad (8)$$

$$s=[s_0,s_1,\ldots,s_{L/2-1}]=S_1^{L/2-1}(Im(c_0(1:L/2-1))), \qquad (9)$$

$c_0$ is the first column of the matrix C and $Q=diag(q)$ is a diagonal matrix with the vector $q=[q_0, q_1, \ldots, q_{L/2+1}]$ on its main diagonal such that $$q_0=1/p_0, \ q_i=1/(p_i^2-s_i^2), i=1,\ldots,L/2-1, \ q_{L/2}=1/p_{L/2}. \qquad (10)$$

Figure 4:
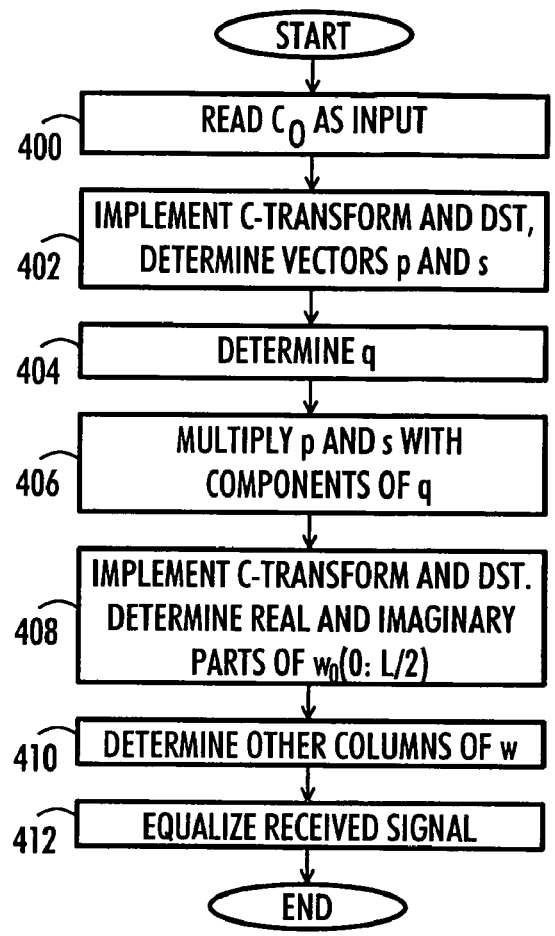
FIG. 4 is a flowchart illustrating an embodiment of the invention.

With reference to the flowchart of FIG. 4, examine an example of the operation of the tap coefficient calculation unit 304 and the equalizing filter 212.

In step 400, the $(L/2+1)$-point subvector $c_0(0:L/2)$ of the first column $c_0$ of the circulant Hermitian matrix C is read as an input to the tap coefficient calculation unit. In the case of an HSDPA receiver, this is the same as the $(L/2+1)$-point subvector of the first components in the first column of the original Toeplitz matrix A and therefore there is no need for constructing the circulant matrix C.

In step 402, vectors p and s are determined according to equations 8 and 9. For this, a $(L/2+1)$-point fast transform is implemented with the matrix $C_1^{L/2+1}$ over the vector $Re(c_0(0:L/2))$ and a $(L/2-1)$-point fast Type 1 DST over the vector $Im(c_0(1:L/2-1))$. Note that a total of $(L/2)\log_2 L-11L/8+4$ real multiplications and $(3L/2)\log_2 L-11L/4-\log_2 L+3$ real additions are performed in this step.

In step 404, vector $q=[q_0, q_1, \ldots, q_{L/2+1}]$ is determined according to equation 10. For this, $L-2$ real multiplications, $L/2-1$ real additions, and $L/2+1$ real divisions are performed.

In step 406, the vectors p and q obtained in step 402 are point-wise multiplied by the components of the vector q obtained in step 404. In this step a total of L real multiplications are needed.

In step 408, the real and the imaginary parts of the vector $\overline{w}_0=w_0(0:L/2)$ are determined according to equation 7. In this step, a $(L/2+1)$-point fast transform is implemented with the matrix $C_1^{L/2+1}$ and a $(L/2-1)$-point fast Type 1 DST. The complexity of this step is the same as the complexity of step 402.

Thus, at this phase the subvector $\overline{w}_0=w_0(0:L/2)$ of the first column $w_0$ of $C^{-1}$ is obtained. In step 410, the whole first column and all the other columns of $C^{-1}$ may be formed by using the equation 6 and circular shifts.

In step 412 the obtained equalization filter coefficients w are taken to the finite impulse response filter 212 which performs equalization to the received signal by filtering the signal.

It should be noted that, the proposed method may easily be modified so that even smaller than $L/2-1$ sized transforms are implemented. In fact, it is sufficient to implement a modified cosine transform of size $m+1$ and a sine transform of size $m-1$, where m is the width of the nonzero tap of the input circulant Hermitian matrix C of equation (3) (or the number of nonzero terms in the first column of the correlation matrix A). However, since fast algorithms for cosine and sine transforms are known for the cases where m is a power of two, it is more reasonable to implement transforms of sizes $M+1$ and $M-1$ where $M=2^{\lceil \log_2 m \rceil}$ is the smallest power of two greater than or equal to m. In most practical cases $M=L/2$. However, $M=L/4$, $M=L/8$, etc., may also be used.

It is possible to implement the proposed solution both in hardware and in software. Taking into account that, on one hand, some flexibility of the matrix size is always desirable and that, on the other hand, real time performance is needed, a mixed software/hardware solution where a program implements the proposed algorithm on a special purpose hardware platform looks most attractive.

Figure 5:
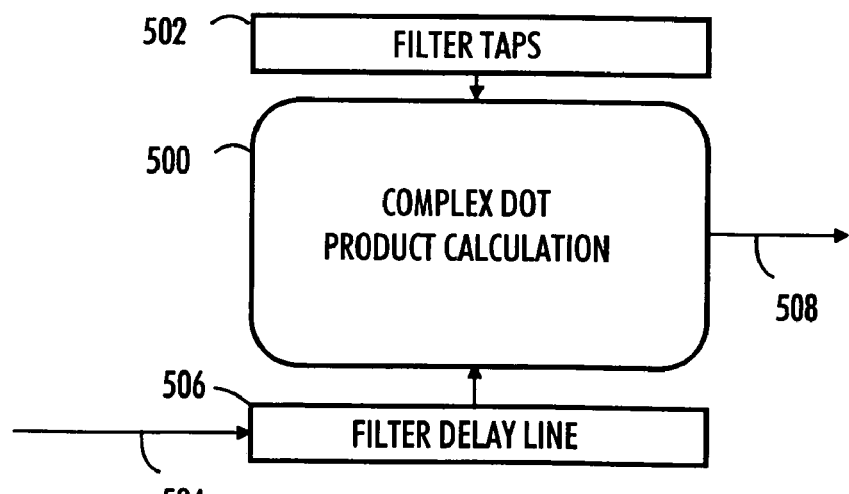
FIG. 5 illustrates en example of the realization of FIR filter.

FIG. 5 illustrates an example of the realization of the FIR filter 212. In the filter, complex dot product calculation 500 is performed according to prior art. The filter taps 502 are determined using the method disclosed above. The received signal 504 is taken to a filter delay line 506 and delayed signal components are multiplied by the tap coefficients 502. In the output is the equalized signal 508.

In Tables 1 and 2 the complexity of the proposed solution is compared to prior art Fast Fourier Transform solutions.

TABLE 1

| | Proposed algorithm | | |
|---|---|---|---|
| Step | Div | Mult | Add |
| 402 | 0 | $\frac{2}{L}\log_2 L$ | $\frac{3L}{2}\log_2 L$ |
| | | $-11\frac{L}{8} + 4$ | $-11\frac{L}{4} - \log_2 L + 3$ |
| 404 | L/2 + 1 | L − 2 | L/2 − 1 |
| 406 | 0 | L | 0 |
| 408 | 0 | $\frac{2}{L}\log_2 L$ | $\frac{3L}{2}\log_2 L$ |
| | | $-11\frac{L}{8} + 4$ | $-11\frac{L}{4} - \log_2 L + 3$ |
| Total | L/2 + 1 | $L\log_2 L$ | $3L\log_2 L$ |
| | | $-\frac{3L}{4} + 6$ | $- 5L - 2\log_2 L + 5$ |

TABLE 2

| | FFT-based algorithm | | | | | |
|---|---|---|---|---|---|---|
| | Count in complex operations | | | Count in real operations | | |
| Step | Div | Mult | Add | Div | Mult | Add |
| 402 | 0 | $\frac{L}{2}\log_2 L$ | $L\log_2 L$ | 0 | $2L\log_2 L$ | $6L(\log_2 L - 1)$ |
| 404 | L | 0 | 0 | L | 0 | 0 |
| 406 | 0 | L | 0 | 0 | 4L | 2L |
| 408 | 0 | $\frac{L}{2}\log_2 L$ | $L\log_2 L$ | 0 | $2L\log_2 L$ | $6L(\log_2 L - 1)$ |
| Total | L | $L\log_2 L$ | $2L\log_2 L$ | L | $4L\log_2 L$ | $12L(\log_2 L - 1)$ |

As can be seen from the tables, the number of operations in both solutions is approximately the same if complex operations are assumed in the FFT-based method to be similar as the real operations in the proposed method. However, in general, one complex multiplication costs approximately four real multiplications and two real additions, while one complex addition costs two real additions. The operation counts with respect to these costs are presented in the last three columns of the Table 2. Taking into account these costs of complex operations, the proposed method is approximately four times less costly than the prior art FFT-based method. Even larger gain may be achieved in the cases where smaller transforms (of orders L/4+1 and L/4−1 or L/8+1 and L/8−1, etc.) are possible to implement in order to invert an m-tap circulant Hermitian matrix with m<L/2.

The proposed solution takes into account that the matrix C is not only circulant but also Hermitian with a real-valued main diagonal. Thus, the number of required operations may be reduced by approximately a factor of four. Instead of implementing an L-point complex-valued FFT, an (L/2)-point real-valued fast Type-1 Discrete Cosine Transform (FDCT-1) and fast Type-1 Discrete Sine Transform (FDST-1) are implemented. This leads to reduced implementation time (due to fewer operations) as well as the required memory and data movements (due to shorter arrays). Since less computation is needed, the power consumption of receivers may be reduced. This is important especially as regards mobile receivers.

Embodiments of the invention may be realized in a receiver of a telecommunication system comprising one or more controllers and calculation units. The controller and calculation units may be configured to perform at least some of the steps described in connection with the flowchart of FIG. 4 and in connection with FIGS. 2 and 3. The embodiments may be implemented as a computer program comprising instructions for executing a computer process for equalizing a received signal in a receiver of a telecommunication system, the process comprising: estimating a channel coefficient matrix from the received signal, determining a channel correlation matrix based on the channel coefficient matrix, determining equalization filter coefficients by applying a first transform to the real parts of a first subset of the terms in the first column of the channel correlation matrix and applying a second transform to the imaginary parts of a second subset of the terms in the first column of the channel correlation matrix, and equalizing the received signal by using the determined equalization filter coefficients.

The computer program may be stored on a computer program distribution medium readable by a computer or a processor. The computer program medium may be, for example but not limited to, a magnetic or semiconductor system medium. The computer program medium may include at least one of the following media: a computer readable medium, a program storage medium, a record medium, a computer readable memory, a random access memory, an erasable programmable read-only memory, and computer readable printed matter.

Embodiments of the invention may be realized in a general signal processor comprising one or more controllers and calculation units. The signal processor may be utilized in general signal processing applications where matrix inversion of a circulant Hermitian is used. Examples of such applications are signal processing, differential equation solution and numerical analysis. The controller and calculation units may be configured to perform at least some of the steps described in connection with the flowchart of FIG. 4 and in connection with FIG. 3. In this case, the input to the unit 300 is a signal in the form of a Hermitian matrix and the output is a signal in the form of the inverse of the circulant matrix.

Even though the invention has been described above with reference to an example according to the accompanying drawings, it is clear that the invention is not restricted thereto but can be modified in several ways within the scope of the appended claims.

The invention claimed is:

1. A method, comprising:
receiving an electronic signal;
electronically estimating a channel coefficient matrix from the received signal;
electronically determining a channel correlation matrix based on the channel coefficient matrix;
electronically converting the channel correlation matrix into a circulant matrix;
electronically determining equalization filter coefficients by applying a first transform to real parts of a first subset of terms in a first column of the circulant matrix and by applying a second transform to imaginary parts of a second subset of the terms in the first column of the circulant matrix; and
electronically equalizing the received electronic signal by using the determined equalization filter coefficients.

2. A method, comprising:
receiving an electronic signal;
electronically estimating a channel coefficient matrix from the received signal;
electronically determining a channel correlation matrix based on the channel coefficient matrix;
electronically determining equalization filter coefficients by applying a first transform to real parts of a first subset of terms in a first column of the channel correlation matrix and by applying a second transform to imaginary parts of a second subset of the terms in the first column of the channel; and
electronically equalizing the received electronic signal by using the determined equalization filter coefficients.

3. The method of claim 1, wherein the first transform is a modified discrete cosine transform of Type 1 and the second transform is a discrete sine transform of Type 1.

4. The method of claim 1, wherein the electronically equalizing is realized by applying a finite impulse response filter to the received signal, the equalization filter coefficients determining taps of the filter.

5. The method of claim 1, the method further comprising:
electronically applying the first transform to $L/2+1$ terms and the second transformation to $L/2-1$ terms, L being a total number of terms in the first column.

6. The method of claim 1, wherein the electronically determining of the equalization filter coefficients comprises calculating the first $L/2+1$ terms of the first column $w_0$ by using the first transform and the second transform, and electronically calculating remaining terms of the first column by utilizing a formula $w_o^i=(w_o^{L-i})^*$, where $i=L/2+1, \ldots, L-1$ and * denotes a complex conjugate.

7. The method of claim 1, wherein the electronically determining of the equalization filter coefficients further comprises calculating the other columns on the basis of the first column $w_0$ by circular shifts.

8. The method of claim 1, wherein the first subset and the second subset exclude at least one term of the first column.

9. An apparatus, comprising:
estimating means for estimating a channel coefficient matrix from a received signal;
determining means for determining a channel correlation matrix based on the channel coefficient matrix;
converting means for converting the channel correlation matrix into a circulant matrix;
determining means for determining equalization filter coefficients by applying a first transform to real parts of a first subset of terms in a first column of the circulant matrix and by applying a second transform to imaginary parts of a second subset of the terms in the first column of the circulant matrix; and
equalizing means for equalizing the received signal by using the determined equalization filter coefficients.

10. An apparatus, comprising:
at least one processor; and
at least one memory including computer program code, wherein the at least one memory and the computer program code are configured to, with the at least one processor, cause the apparatus at least to perform:
estimating a channel coefficient matrix from a received signal,
determining a channel correlation matrix based on the channel coefficient matrix,
converting the channel correlation matrix into a circulant matrix,
determining equalization filter coefficients by applying a first transform to real parts of a first subset of terms in a first column of the circulant matrix and by applying a second transform to imaginary parts of a second subset of the terms in the first column of the circulant matrix, and
equalizing the received signal by using the determined equalization filter coefficients.

11. An apparatus, comprising:
at least one processor; and
at least one memory including computer program code, wherein the at least one memory and the computer program code are configured to, with the at least one processor, cause the apparatus at least to perform:
estimating a channel coefficient matrix from a received signal,
determining a channel correlation matrix based on the channel coefficient matrix,
determining equalization filter coefficients by applying a first transform to real parts of a first subset of terms in a first column of the channel coefficient matrix and by applying a second transform to imaginary parts of a second subset of the terms in the first column of the channel coefficient matrix, and
equalizing the received signal by using the determined equalization filter coefficients.

12. The apparatus of claim 10, wherein the at least one memory and the computer program code are configured to, with the at least one processor, cause the apparatus at least to further perform:
utilizing discrete cosine transform as the first transform and discrete sine transform as the second transform.

13. The apparatus of claim 10, wherein the at least one memory and the computer program code are configured to, with the at least one processor, cause the apparatus at least to further perform:
equalizing the received signal by applying a finite impulse response filter to the received signal, the equalization filter coefficients determining taps of the filter.

14. The apparatus of claim 10, wherein the at least one memory and the computer program code are configured to, with the at least one processor, cause the apparatus at least to further perform: applying the first transform to $L/2+1$ terms and the second transform to $L/2-1$ terms, L being a total number of terms in the first column.

15. The apparatus of claim 10, wherein the at least one memory and the computer program code are configured to, with the at least one processor, cause the apparatus at least to further perform:
calculating first $L/2+1$ terms of the first column $w_0$ by using the first transform and the second transform, and remaining terms of the first column by using a formula $w_o^i=(w_o^{L-i})^*$, where $i=L/2+1, \ldots, L-1$ and * denotes a complex conjugate.

16. The apparatus of claim 15, wherein the at least one memory and the computer program code are configured to, with the at least one processor, cause the apparatus at least to further perform:
calculating other columns by circular shifts on the basis of the first column $w_0$.

17. A computer program embodied on a computer readable medium, the computer program configured to, when used with at least one processor, cause at least the following:
estimating a channel coefficient matrix from the received signal;
determining a channel correlation matrix based on the channel coefficient matrix;
determining equalization filter coefficients by applying a first transform to real parts of a first subset of terms in a first column of the channel correlation matrix and by applying a second transform to imaginary parts of a second subset of the terms in the first column of the channel correlation matrix; and equalizing the received signal by using the determined equalization filter coefficients.

18. The computer program of claim 17, the medium including at least one of the following media: a computer readable medium, a program storage medium, a record medium, and a computer readable memory.

19. A method performed by a processor, comprising:
receiving as input an electronic signal in a form of a Hermitian matrix;
electronically converting the Hermitian matrix into a circulant matrix;
electronically determining an inverse of the circulant matrix by applying a first transform to real parts of a first subset of terms in a first column of the circulant matrix and by applying a second transform to imaginary parts of a second subset of the terms in the first column of the circulant matrix;
electronically calculating the other columns on the basis of the first column by circular shifts; and
electronically outputting a signal in a form of the inverse of the circulant matrix.

20. The method of claim 19, the method further comprising:
electronically applying the first transform to L/2+1 terms, and the second transformation to L/2−1 terms, L being a total number of terms in the first column.

21. An apparatus, comprising:
at least one processor; and
at least one memory including computer program code, wherein the at least one memory and the computer program code are configured to, with the at least one processor, cause the apparatus at least to perform:
convert an Hermitian matrix into a circulant matrix,
determine an inverse of the circulant matrix by applying a first transform to real parts of a first subset of terms in a first column of the circulant matrix and by applying a second transform to imaginary parts of a second subset of the terms in the first column of the circulant matrix,
calculate other columns on the basis of the first column by circular shifts, and
output a signal in a form of the inverse of the circulant matrix.

22. A computer program embodied on a computer readable medium, the computer program configured to, when used with at least one processor, cause at least the following:
receiving a signal;
estimating a channel coefficient matrix from the received signal;
determining a channel correlation matrix based on the channel coefficient matrix;
converting the channel correlation matrix into a circulant matrix;
determining equalization filter coefficients by applying a first transform to real parts of a first subset of terms in a first column of the circulant matrix and by applying a second transform to imaginary parts of a second subset of the terms in the first column of the circulant matrix; and
equalizing the received signal by using the determined equalization filter coefficients.

23. A computer program embodied on a computer readable medium, the computer program configured to, when used with at least one processor, cause at least the following:
receiving as input a signal in a form of a Hermitian matrix;
converting the Hermitian matrix into a circulant matrix;
determining an inverse of the circulant matrix by applying a first transform to real parts of a first subset of terms in a first column of the circulant matrix and by applying a second transform to imaginary parts of a second subset of the terms in the first column of the circulant matrix;
calculating the other columns on the basis of the first column by circular shifts; and
outputting a signal in a form of the inverse of the circulant matrix.

\* \* \* \* \*